United States Patent
Chung et al.

(10) Patent No.: US 9,688,895 B2
(45) Date of Patent: *Jun. 27, 2017

(54) METHODS AND MATERIALS FOR HYDROCARBON RECOVERY

(71) Applicant: The Penn State Research Foundation, University Park, PA (US)

(72) Inventors: Tze Chiang Chung, State College, PA (US); Xue Pei Yuan, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,283

(22) Filed: Aug. 15, 2016

(65) Prior Publication Data

US 2016/0355715 A1 Dec. 8, 2016

Related U.S. Application Data

(63) Continuation of application No. 14/801,414, filed on Jul. 16, 2015, which is a continuation of application No. 13/213,736, filed on Aug. 19, 2011, now Pat. No. 9,109,057.

(60) Provisional application No. 61/375,592, filed on Aug. 20, 2010.

(51) Int. Cl.

| | |
|---|---|
| *C08F 10/00* | (2006.01) |
| *C09K 3/32* | (2006.01) |
| *C08F 212/08* | (2006.01) |
| *C02F 1/28* | (2006.01) |
| *C08F 210/14* | (2006.01) |
| *B01J 20/26* | (2006.01) |
| *C02F 101/32* | (2006.01) |
| *C02F 103/00* | (2006.01) |
| *C02F 1/68* | (2006.01) |
| *C08F 210/16* | (2006.01) |

(52) U.S. Cl.
CPC .............. *C09K 3/32* (2013.01); *B01J 20/267* (2013.01); *C02F 1/285* (2013.01); *C08F 10/00* (2013.01); *C08F 210/14* (2013.01); *C08F 212/08* (2013.01); *C02F 1/681* (2013.01); *C02F 2101/32* (2013.01); *C02F 2103/007* (2013.01); *C02F 2303/16* (2013.01); *C08F 210/16* (2013.01); *Y02W 10/37* (2015.05)

(58) Field of Classification Search
CPC ...... C08F 10/00; C08F 210/14; C08F 210/16; C08F 212/36; C08F 212/08; C08F 2500/03; C08F 1/285; C08F 1/681; C09K 3/32

See application file for complete search history.

(56) References Cited

U.S. PATENT DOCUMENTS

| | | | |
|---|---|---|---|
| 4,172,031 | A | 10/1979 | Hall et al. |
| 5,239,007 | A | 8/1993 | Le-Khac |
| 5,639,541 | A | 6/1997 | Adam |
| 5,641,847 | A | 6/1997 | Hozumi et al. |
| 5,688,843 | A | 11/1997 | Inaoka et al. |
| 6,414,102 | B2 | 7/2002 | Chung et al. |
| 6,485,639 | B1 | 11/2002 | Gannon et al. |
| 6,559,234 | B1 | 5/2003 | Arai et al. |
| 6,881,493 | B2 | 4/2005 | Haveaux et al. |
| 8,239,007 | B2 | 8/2012 | Voegele et al. |
| 2002/0161130 | A1 | 10/2002 | Arai et al. |

FOREIGN PATENT DOCUMENTS

| | | |
|---|---|---|
| JP | 9-255878 A | 9/1997 |
| JP | 2004-066054 | 3/2004 |

OTHER PUBLICATIONS

International Search Report and The Written Opinion of the International Searching Authority issued in International Application No. PCT/US2011/048469 dated Apr. 9, 2012.
Karan, C. P.; Rengasamy, R. S.; Das, D. Indian J Fibre & Textile Res. 2011, 36, 190.
Arbatan, T.; Fang, X.Y.; Shen, W. Chem. Eng. J 2011, 166, 787.
Karakasi, O.K.; Moutsatsou, A. Fue/ 2010, 89, 3966.
Chol. H.M.; Cloud, R. M. Environ Sci. Technol. 1992, 26, 772.
Teas, C.; Kalligeros, S.; Zanikos, F.; Stournas, S.; Lois; E.; Anastopoulos, G. Desalination 2001, 140, 259.
Inagaki, M.; Kawahara, A.; Konno, H. Carbon 2002,40, 105.
Adebajo, M. O.; Frost, R. L.; Kloprogge, J. T.; Carmody, 0.; Kokot, S. J Porous Materials 2003, 10, 159.
Deschamps, G.; Caruel, H.; Borredon, M. E.; Bonnin, C.; Vignoles, C. Environ Sci. Technol 2003, 37, 1013.
Suni, S.; Kosunen, A. L.; Hautala, M.; Pasila, A.; Romantschuk, M. Marine Pollution Bull. 2004, 49, 916.
Sun, X.F.; Sun R.C.; SunJX J Mater. Sc. 2003,38, 3915.
Bayat, A.; Aghamiri, S. F.; Moheb, A.; Vakili-Nezhaad, G. R. Chem. Eng. Technol. 2005, 28, 1525.
Jang, J.; Kim B.S. J Appl. Polym. Sci. 2000, 77, 903.
Atta, A.M.; Arndt, K. F. J Appl. Polym. Sci. 2005, 97, 80.
Atta, A. M.; El-Hamouly, S. H.; AlSabagh, A. M.; Gabr, M. M. J Appl. Polym. Sci. 2007, 105,2113.
Farag, R.K.; El-Saeed, S.M. J Appl. Polym. Sci. 2008, 109,3704.
Shan, G.R.; Xu, P.X.; Weng, Z.X.; Huang, Z.M. J Appl. Poym. Sci. 2003, 89, 3309.
Ceylan, D.; Dogu, S.; Karacik, B.; Yakan, S.; Okay, O.S.; Okay, 0. Environ Sci. Technol. 2009,43,3846.
Essawy, H.A.; Essa, M.M.; Abdeen, Z. J Appl. Polym. Sci. 2010, 115, 385.
Zhou, M. H.; Cho, W. J. J Appl. Polym. Sci. 2002,85,2119.
Zhou X.M.; Chuai, C.Z. J Appl. Polym. Sci. 2010, 115, 3321.
Fouchet, B. J Appl. Polym. Sci. 2009, 111, 2886.
Lin, C.; Huang, C.L.; Shem, C. C. Resource Conservation and Recycling 2008, 52, 11162.

(Continued)

*Primary Examiner* — Peter D Mulcahy
(74) *Attorney, Agent, or Firm* — McDermott Will & Emery LLP (57) ABSTRACT

Crosslinked polyolefins for use in recovering or containing hydrocarbons such as hydrocarbons contained in oil, are disclosed. Advantageously, the crosslinked polyolefins absorb the hydrocarbon to form a gel that can be collected and processed by heat to release the collected hydrocarbons.

9 Claims, 4 Drawing Sheets

(56) References Cited

OTHER PUBLICATIONS

Zhu, H.; Qiu, S.; Jiang, W.; Wu, D.; Zhang, C. Environ Sci. Technol 2011, 45, 4527.

Tanobe, V.O.A.; Sydenstricker, T.H.D.; Amico, S.C.; Vargas, J.V.C.; Zawadzki, S.F. J Appl. Polym. Sci. 2008, 111, 1842.

Lin, W.T. ; Shao, Z.; Dong, J.Y.; Chung, T.C. Macromolecules 2009, 42, 3750.

Yuan, X.P.; Chung, T.C. Appl. Phys. Lett. 2011, 98, 062901.

Zhou, et al., J Appl. Polym. Sci. 2003,89, 1818.

Non-final Office Action issued in corresponding U.S. Appl. No. 13/213,736 dated Oct. 7, 2013.

Final Office Action issued in corresponding U.S. Appl. No. 13/213,736 dated Jun. 9, 2014.

Notice of Allowance issued in corresponding U.S. Appl. No. 13/213,736 dated Jun. 10, 2015.

Figure 1: (left) polyolefin and (right) the corresponding oil-absorbed polyolefin gel Figure 2. (a) DSC curves; (b) TGA thermographs

METHODS AND MATERIALS FOR HYDROCARBON RECOVERY

CROSS-REFERENCE TO RELATED APPLICATIONS

This application is a continuation of U.S. patent application Ser. No. 14/801,414, filed Jul. 16, 2015, which is a continuation of U.S. patent application Ser. No. 13/213,736, filed on Aug. 19, 2011, which claims the benefit of U.S. Provisional Applicant No. 61/375,592, filed Aug. 20, 2010, the disclosures of which are incorporated by reference herein.

TECHNICAL FIELD

The present invention relates to polyolefins for use in recovering hydrocarbons, such as in absorbing hydrocarbons from crude oil or petroleum products and releasing the recovered hydrocarbons in a separation process.

BACKGROUND

Effective technology for removing, recovering, and cleaning up oil spills or oil slicks from the surface of sea water and shorelines are still needed. Typically, the collection of such spills are carried out by applying materials that absorb and/or adsorb the oil. Adsorption is the adhesion of molecules to the surface of the material and typically results in the oil coating the surfaces (pores and capillaries) of the adsorbent material. Adsorbent materials typically have a microcrystalline matrix that is not readily penetrated by the oil and therefore does not swell when adsorbing oil. On the other hand, absorption is the penetration of molecules to the bulk phase of the material and typically results in the oil contained within the absorbent material. Affinity between the oil and absorbent material drives oil molecules into the absorbent matrix. Highly, absorbent materials are usually oil soluble. Cross-linking of such materials is required to maintain the integrity of the absorbent and prevent its dissolution into the oil.

There have been some studies reporting the sorption (sorption is the general term for adsorption and/or absorption) of spilled oils with inorganic mineral products (i.e. clay, silica, zeolites, etc.) and organic vegetable products (straw, corn cob, peat moss, wood fiber, cotton fiber, etc.) (M. O. Adebajo, R. L. Frost, R. L., J. T. Kloprogge, O. Carmody, S. Kokot, "Porous materials for oil spill cleanup: a review of synthesis and absorbing properties", J. Porous Materials, 2003, 10, 159-170). Most of these materials show limited oil absorption capacity and also absorb water; therefore the oil absorbers that are recovered are unsuitable for calcination. Many of these products end-up in land fields after use.

Several synthetic fibers, including crystalline polyethylene and polypropylene (PP) fibers (U.S. Pat. No. 5,639,541) and meltblown polypropylene pads and booms (Bayat, et al., Chem. Eng. Technol. 2005, 28, 1525) have been disclosed; these materials generally recover oil in their interstices by capillary action. Because the weak oil-substrate interaction, the fiber-based sorbers exhibit many disadvantages, including failure to maintain oil of low viscosity, easy re-bleeding of the sorbed oil under a slight external force, and poor recovery of oil after it has sunk in water.

There are patents disclosing the use of synthetic resins, such as cross-linked styrenic and acrylic copolymers, which absorb oil in their hydrophobic molecular structure. Cross-linking is needed to prevent the polymer from dissolving in the oils (U.S. Pat. Nos. 5,239,007; 5,641,847; and 5,688,843). Such material have the advantage of selectively absorbing oil floating on the surface of water, and have good oil-maintaining properties of absorbed oil. However, these synthetic resins have the drawback of a long absorbing time in comparison with that of fibers. In particular, they fail to absorb high viscosity oil within a short time. Some methods, i.e. milling the oil absorber to increase surface area, were proposed to improve the oil absorbing speed for high viscosity oil, but were met with limited success. The milled oil absorbers are liable to aggregate, thereby the gel block phenomenon prevents the admission of oil to be absorbed into further gaps between the particles of oil absorber.

Further, there are literature reports disclosing the use of cross-linked styrene/acrylate (Jang, et al., J. Appl. Polym. Sci. 2000, 77, 903), 1-octene/acylate (Atta, et al., J. Appl. Polym. Sci. 2005, 97, 80), and octadecene/maleic anhydride copolymers (Atta, et al., J. Appl. Polym. Sci. 2007, 105, 2113). However, these resins contain some hydrophilic polar groups and require additional procedures for cross-linking reaction after copolymerization, and having the drawback of a long absorbing time, especially for aliphatic hydrocarbon components. Some synthesized rubbers, such as polybutadiene (Shan, et al., J. Appl. Polym. Sci. 2003, 89, 3309), butyl rubber (Ceylan, et al., Environ Sci. Technol. 2009, 43, 3846), SBR (Fouchet, B., J. Appl. Polym. Sci. 2009, 111, 2886), and EPDM (Zhou, et al., J. Appl. Polym. Sci. 2003, 89, 1818), were also modified (grafting and cross-linking) to achieve the network structure for oil absorption. However, the solution cross-linking procedure typically used with such materials is not controlled. Moreover, these materials usually require extensive solvent extraction to remove any soluble polymer fraction prior to use (Zhou, et al., J. Appl. Polym. Sci. 2002, 85, 2119), and the resulting sol-free materials possess various degree of cross-linking density that reduces the overall oil swelling capability. Some methods, i.e. milling, electric-spinning, and foaming of the oil absorbents to increase surface area, were applied to improve the oil absorbing speed. However, these materials, similar to that of meltblown PP, just physically adsorb oil at the surface by capillary action, and thereby intrinsically prevent the further penetration of oil into matrixes.

Accordingly, there is a continuing need for absorbent materials that can quickly collect and retain hydrocarbons and other such contaminates, as is necessary in the case of oil spills and oil contaminated areas and liquids. Furthermore, there is also a need for absorbent materials that can advantageously minimize the treatment of the absorbent after use, including waste disposal, and improve recyclability and biodegradability of the recovered absorbent and its contents.

SUMMARY OF THE DISCLOSURE

Advantages of the present invention include polymers, compositions, and methods for containment, collection, separation and/or recovering of hydrocarbons, such as a mixture of hydrocarbons contained in oil, from an environment, such as surface water, shorelines, or an enclosed environment such as a container or vessel.

An additional advantage of the present invention is a method of recovering a hydrocarbon by contacting at least one hydrocarbon or a mixture of hydrocarbons, such as contained in petroleum or crude oil, with a crosslinked polyolefin to absorb the hydrocarbon into the crosslinked polyolefin. Advantageously, the crosslinked polyolefin absorbs the hydrocarbon to form a gel (i.e., a hydrocarbon-polyolefin composition) that can be collected and processed by heat to release the collected hydrocarbon and substantially decompose the crosslinked polyolefin, preferably into additional hydrocarbons. The release of hydrocarbon and decomposition of polyolefin can advantageously be carried out in a typical commercial oil refining process such that the hydrocarbon-polyolefin composition can be treated in more or less the same manner as an oil feedstock in a refining process.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

The present disclosure relates to new absorbent polymers, i.e. absorbent crosslinked polyolefins that can advantageously absorb one or more hydrocarbons, such as hydrocarbons contained in crude oil, petroleum products, waste water, or areas containing one or more hydrocarbons. Advantageously the polymers of the present disclosure can simultaneously exhibit properties desirable for recovering hydrocarbons from an oil spill, including (a) high oil absorption capacity, (b) fast sorption kinetics, (c) little to no water absorption, (d) buoyancy for easy recovery from surface water surface and good mechanical strength, (e) the recovered oil-polymer composition is suitable for use in a typical commercial oil refining processes, and (f) cost effectiveness.

The absorbent crosslinked polyolefins of the present disclosure contain one or more olefinic monomers with a high affinity for a target hydrocarbon, or mixture of hydrocarbons, and crosslinking units so that the polyolefin does not dissolve in the target hydrocarbon. Preferably, the crosslinked polyolefins of the present disclosure contain both aliphatic and aromatic repeating units as well as the crosslinking units. For increased absorption rates, the crosslinked polyolefins have a complete, but lightly cross-linked network structure. The crosslinked polyolefins can also have the following independent features, including an amorphous morphology; a low glass transition temperature (Tg), (as determined by differential scanning calorimetry (DSC) described herein or equivalent equipment and procedures) e.g., a Tg of less than about 10° C., such as a low as less than about 0° C. or −10° C.; and a large free volume.

Figure 1:
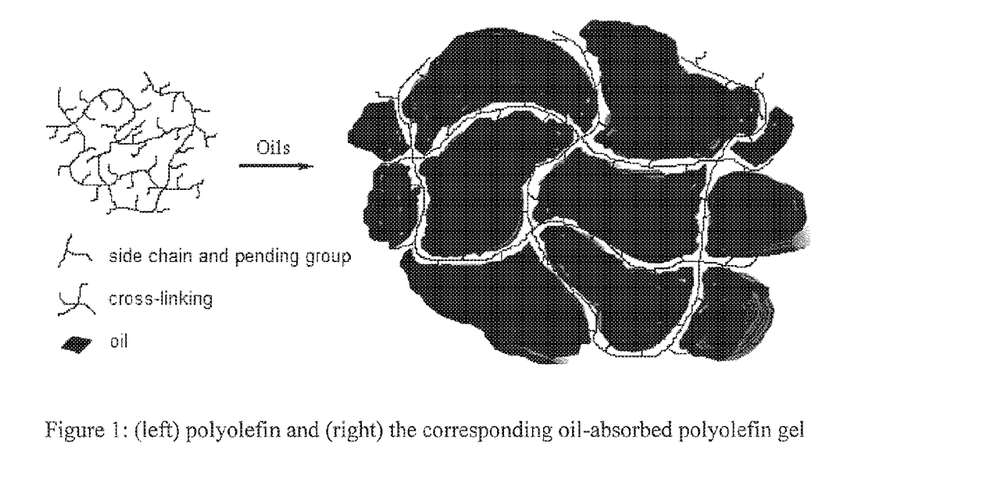
FIG. 1 is a schematic representation of a polyolefin according to the present disclosure (left) and the corresponding polyolefin gel containing absorbed hydrocarbon (right).

As a schematic representation of an embodiment of the present disclosure, FIG. 1 presents an amorphous polyolefin copolymer structure (left), having high free volume (due to side chains and/or pendant groups from monomer units) and a network structure (due to the cross-linking of its matrix). The crosslinked polyolefin shown in FIG. 1 can rapidly absorb hydrocarbons due the high affinity between the hydrocarbon and/or polymer and/or side chains or pendant groups off of the backbone of polyolefin such that the matrix swells its volume to form a hydrocarbon-polyolefin composition (i.e., gel). This structure is shown on the right side of FIG. 1.

In practicing an embodiment of the present disclosure, at least one hydrocarbon, or preferably a mixture of hydrocarbons, such as in crude oil or a petroleum product, is recovered by contacting the at least one hydrocarbon with a crosslinked polyolefin. Hydrocarbons of particular interest include, one or more of, or a mixture of aliphatic and aromatic hydrocarbons (e.g., alkanes, such as hexane, cyclohexane, heptane, octane; alkenes, such as hexene, heptene, octene; aromatics such as benzene, toluene, xylene), common petroleum products (e.g., paraffins, naphtha, gasoline, kerosene, diesel, fuel oil, etc.), hydrocarbons contained in waste water, such as formed through oil recovery process, etc. By this process, the crosslinked polyolefin absorbs the at least one hydrocarbon to form a gel. Advantageously, the gel comprises the polyolefin and the hydrocarbon. The crosslinked polyolefin can be optimized for recovering a particular hydrocarbon or mixture of hydrocarbons by selecting appropriate olefinic monomers and crosslinking monomers to prepare the crosslinked polymer. The crosslinked polyolefin can also include aromatic monomers for increasing the performance of the polymer to certain hydrocarbon sorption. In one aspect of the present disclosure, the hydrocarbon absorption capacity of a crosslinked polyolefin is greater than about 10. The absorption capacity as used herein is determined according to the measurement method described further below. In other embodiments of the present disclosure, the crosslinked polyolefin has an absorption capacity that is greater than about 20, about 30 and even greater than about 40.

In one aspect of the present disclosure, the crosslinked polyolefin is formed from one or more olefins selected from the group consisting of: ethylene, propylene, 1-butene, 1-pentene, 1-hexene, 1-heptene, 1-octene, 1-nonene, 1-decene, 3-methyl-1-butene, 4-methyl-1-pentene, 3-methyl-1-pentene, 4-methyl-1-hexene, 3,3-dimethyl-1-butene, and 4,4-dimethyl-1-hexene, and combinations thereof. The crosslinked polyolefin can also be formed from one or more repeating units selected from the group consisting of: styrene, alkylstyrenes, such as p-methylstyrene, o-methylstyrene, m-methylstyrene, 2,4-dimethylstyrene, 2,5-dimethylstyrene, 3,4-dimethylstyrene, 3,5-dimethylstyrene and t-butylstyrene, and a combination thereof. Furthermore, the crosslinked polyolefin can also be formed from one or more repeating units selected from non-conjugated diene, including 1,5-hexadiene, 1,7-octadiene, 1,2-divinylbenzene, 1,3-divinylbenzene, 1,4-divinylbenzene, 4-propenylstyrene, 4-butenylstyrene, 4-pentenylstyrene, 4-hexenylstyrene, and a combination thereof. In another aspect of the present disclosure, the crosslinked polyolefin can be formed from about 60-95 mole %, e.g., about 60-85 mole %, of one or more alpha olefin, e.g. one or more alpha olefin noted above; from about 5 to 40 mole %, e.g., 15 to 40 mole %, of one or more aromatic monomer, e.g., one or more aromatic monomer noted above; and from about 0.1 to 3 mole %, e.g., 0.1 to about 2% of one or more crosslinker, e.g. one or more crosslinker noted above.

Alternatively and separately, the crosslinked polyolefins of the present disclosure can be represented by the following formula (I):

$$\begin{array}{c} R \\ | \\ \text{—}(CH_2\text{—}CH)_n(CH_2\text{—}CH)_p(CH_2\text{—}CH)_q\text{—} \\ | \quad | \\ Ar \quad R_2 \\ | \\ X \\ | \\ R \quad R_2 \\ | \quad | \\ \text{—}(CH_2\text{—}CH)_n(CH_2\text{—}CH)_p(CH_2\text{—}CH)_q\text{—} \\ | \\ Ar \end{array} \quad (I)$$

wherein ($CH_2$—$CH(R)$) represents the same or different olefin repeating unit, e.g. a $C_6$-$C_{30}$ alpha olefin; R is independently H or a $C_1$-$C_{30}$ linear, branched, or cyclic alkyl moiety; n is an integer greater than about 500, e.g., between about 500 and 50,000; ($CH_2$—$CH(Ar)$) represents the same or different aromatic repeating unit, e.g., a styrene unit; Ar is an aryl moiety that can be substituted with one or more $R_1$ groups; wherein $R_1$ is a $C_1$ to $C_{10}$ linear, branched, or cyclic alkyl moiety that can be substituted with one or more $C_1$ to $C_5$ alkyl groups; p is an integer in the range from 0 to greater than 50, e.g., 50 to 20,000. Since "p" can be zero it is understood that the crosslinked polyolefin does not necessarily contain (CH2-CH(Ar)) units. The variable $R_2$ is either present or absent. When $R_2$ is present, $R_2$ is a $C_1$ to $C_{10}$ linear, branched, or cyclic alkyl moiety that can be substituted with one or more $C_1$ to $C_5$ alkyl groups; X is a cross-linking moiety resulting from a thermal induced cycloaddition reaction between two pendent olefinic units, e.g., a divalent $C_4$-$C_{18}$ hydrocarbon unit such as a —$CH_2CH_2CH_2CH_2$—, or —$C_{16}H_{13}$— unit; and q is an integer greater than about 5, e.g., from about 5 to about 100.

In one embodiment of the present disclosure, ($CH_2$—$CH(R)$) represents the same or different $C_6$-$C_{30}$ alpha olefin, e.g., 1-hexene, 1-octene, and 1-decene; ($CH_2$—$CH(Ar)$) represents a styrene monomer, e.g., styrene, p-methylstyrene, and t-butylstyrene; p is an integer greater than about 50; ($CH_2$—CH)—$R_2$—X—$R_2$—(CH—$CH_2$) is formed by the cycloaddition of two pendent styrene units, e.g. between two divinylbenzene units; and the ratio of n to p is greater than about 2, e.g., greater than about 3 or 4.

In another alternative and separate aspect of the disclosure, the crosslinked polyolefin can have a long chain branched (LCB) structure with the following formula (II):

wherein R, n, $R_1$, p, $R_2$, q and X are as defined above. Alternatively and separately, the formula (II) can contain some long chain branches, resulting from chain transfer reaction to the pendent olefin units (after mono-enchainment of non-conjugated diene units) during the polymerization. The long chain branching number (r) can be zero or the number up to about 100. In the case where r is 0, formula (II) is the same as the formula (I). In each branch, the average number of repeating ($CH_2$—$CH(R)$) units (n') is an integer between 200 and 5,000, and the average number of repeating ($CH_2$—$CH(Ar)$) units (p') is an integer between 20 and 2,000. The moiety X' in formula (II) is the residue of pendent olefinic unit after a chain transfer reaction incorporating a side chain, e.g., a residue formed by chain transfer reaction with a pendant styrene unit during the polymerization. In other words, X' can be a divalent $C_2$-$C_{18}$ hydrocarbon unit in forming the LCB structure.

In each formulae, the crosslinked polyolefin can contain olefin repeating units selected from the group consisting of: ethylene, propylene, 1-butene, 1-pentene, 1-hexene, 1-heptene, 1-octene, 1-nonene, 1-decene, 3-methyl-1-butene, 4-methyl-1-pentene, 3-methyl-1-pentene, 4-methyl-1-hexene, 3,3-dimethyl-1-butene, and 4,4-dimethyl-1-hexene, and combinations thereof; and pendant aromatic moieties (Ar) selected from the group consisting of phenyl, p-methylphenyl, o-methylphenyl, m-methylphenyl, 2,4-dimethylphenyl, 2,5-dimethylphenyl, 3,4-dimethylphenyl, 3,5-dimethylphenyl and p-t-butylphenyl, and combinations thereof.

Further, the crosslinked polyolefins of the present disclosure can also be formed by thermal reactions between two or more pendant vinyl residues on the polyolefin chain. They are from one or more repeating units selected from non-conjugated diene, including 1,5-hexadiene, 1,7-octadiene, 1,2-divinylbenzene, 1,3-divinylbenzene, 1,4-divinylbenzene, 4-propenylstyrene, 4-butenylstyrene, 4-pentenylstyrene, 4-hexenylstyrene, and a combination thereof. The vinyl residues can be either linked directly to the chain or with an alkyl or aryl spacer. For example, in the formula above, X can be a cross-linking moiety that is a residue formed by a thermal cycloaddition reaction between two pendant styrene units, e.g., a divalent —$C_{16}H_{13}$— unit. Alternatively and separately, X can be a cross-linking moiety that is a residue formed by an addition reaction between pendant olefin units or between a styrene unit and a pendent olefin unit. For example, in the formulae above, X' can be the residue of pendent olefinic unit after a chain transfer reaction in forming a LCB structure. An X' residue with (φ-$CH_2$—$CH_2$) unit is formed after chain transfer reaction with a pendant styrene unit during the polymerization.

In one aspect of the present disclosure, the polyolefin is prepared with a relatively high molecular weight, e.g., $M_w$ greater than about 100,000 g/mole, preferably greater than about 200,000 g/mole, prior to crosslinking. Preferably the polyolefin has a relatively narrow molecular weight distribution ($M_w/M_n$) of less than about 4, e.g., less than about 3, prior to crosslinking. In one aspect of the present invention, the polyolefin is crosslinked by heating the material in the bulk phase. For example, pendent styrene units on the polyolefin chain can be thermally crosslinked in the bulk phase by heating the material to temperatures of greater than about 220° C. This process fully crosslinks the polyolefin. The polyolefin can also be thermally crosslinked by incorporating olefins having pendent vinyl groups to thermally react with one another or other vinyl groups pendent on the polyolefin chain to form a crosslinked polyolefin. Further, the crosslinked polyolefin of the present disclosure is preferably completely amorphous, i.e., the polymer has only one Tg transition and no detectable melting points (as determined by DSC described herein or equivalent equipment and procedures). Overall, the combination of a facile self-initiated thermal cycloaddition reaction (without any external reagent) and no by-product provides a convenient and economic process to prepare the crosslinked polyolefin products.

Polyolefin is an important class of commercial polymers and since they are prepared from petroleum downstream products, they exhibit many similar physical properties with the major components in crude oils. They are also inexpensive polymeric material, with a large production capacity around the world. However, crosslinked polyolefins are not in common use, despite the advantages of crosslinking the polymer structure, e.g., increasing temperature stability and resistance to electrical discharge, solvents, creep, and stress-cracking. Most crosslinked polyolefins are based on polyethylene (PE) and ethylene/propylene/diene elastomer (EPDM) polymers. The common cross-linking processes, including high energy irradiation (γ-rays and electron beams), peroxide-induced radical reactions, and silane-moisture cure mechanisms, are not particularly suitable in high alpha-olefin polymers. This is due to the inherent difficulties that the polymer backbone exhibits prompt degradation under free radical conditions, and catalyst poisoning during the transition metal mediated copolymerization of the cross-linkable silane-containing comonomers. In addition, most of the crosslinked polyolefin products do not have a complete network structure. That is, the gel content (insoluble fraction after solvent extraction) is generally below 90%. Recently, we have reported an effective bulk (solid state) crosslinking process (Lin et. al., *Macromolecules* 2009, 42, 3750), involving a polypropylene (PP) copolymer that contains a few percentage of pendent styrene groups. Under elevated temperature (>160° C.), the pendent styrene units spontaneously engage in regiospecific [2+4] inter-chain cycloaddition reactions between two adjacent styrene units to form a complete 3-D network, even with a very low concentration of styrene units. Under the solid state condition, with highly entangled polymer chains and facile coupling reaction, offers convenient crosslinking chemistry. In addition, this self cross-linking process results in a complete crosslinked polypropylene network with high purity and essentially free of contaminants.

Preferably, the crosslink density and hydrocarbon affinity of the polyolefins of the present disclosure are optimized such that the crosslinked polyolefin absorbs a target hydrocarbon to the maximum extent for the particular application. For example, a lower cross-linking density results in higher degree of swelling. Polyolefins prepared from one or more alpha olefin monomers having a pendant hydrocarbon moiety, such as 1-octene and 1-decene, are similar to the petroleum downstream products in refining crude oil and have similar solubility parameters (oleophilic and hydrophobic properties) as the hydrocarbon components in crude oil. The use of aromatic monomers, e.g., styrenes, with the alpha olefin monomers can further increase the affinity of crude oil to the polyolefin.

Thus, for the application of recovering crude oil from the environment such as crude oil in an open water environment, the polyolefin should be lightly crosslinked and prepared with olefin monomers with at least one $C_6$-$C_{30}$ alpha olefin, with or without aromatic monomers. The combination of strong affinity of the oil to the olefinic monomers, open amorphous morphology (high free volume) due, in part, to the use of relatively long chain olefins, which form branched pendant groups from the main polymer chain, and, if present, aromatic pendant groups, and light cross-linking, allow oil diffusion in such a polyolefin matrix with fast kinetics. Such crosslinked polyolefins can rapidly expand its matrix and achieve high oil absorption capacity and retention. In this embodiment, the oil molecules are captured inside the polymer matrix, with minimal or even completely without water absorption. The resulting polyolefin/oil composition can float on the water surface with good stability even after long exposure to air, and with minimal re-bleeding of the absorbed oil under waves or during the recovery operation.

Use of such material can be applied directly to the top of the leaking well head or oil slick or on an oil contaminated shoreline to form a gel that floats and can be readily collected and removed to mitigate pollution of water and air by an oil spill.

In addition to effective oil recovery, the resulting gel can be treated as crude oil, suitable for regular refining processes (distillation and cracking). In practicing an embodiment of the present disclosure, hydrocarbon can be separate from a crosslinked polyolefin gel by heating the crosslinked polyolefin containing the at least one hydrocarbon. In one aspect of the present disclosure the oil loaded crosslinked polyolefin gel contains little to no water and has a composition similar to the original crude oil. During refining the gel, the minor component of the gel, which is the crosslinked polyolefin in about 2 wt % to about 5 wt % can be thermally decomposed back to small hydrocarbon molecules without residue.

In another aspect, the crosslinked polyolefins of the present disclosure can be thermally decomposed back to low molecular weight hydrocarbons, e.g., monomers and other low molecular weight hydrocarbons, at elevated temperatures, e.g. from between about 300° C. to about 600° C. Preferably, the crosslinked polyolefins of the present disclosure can be thermally decomposed at temperatures of less than about 500° C., e.g., between about 300° C. to about 500° C. It is believed that the temperature used in the first refining or distillation step in a typical commercial oil refining process is greater than 600° C.

In one embodiment of the present disclosure, the crosslinked polyolefin absorbs the hydrocarbon to form a gel (i.e., a hydrocarbon-polyolefin composition) that can be collected and decomposed by heat to release the hydrocarbon and substantially decompose the crosslinked polyolefin, preferably, into additional hydrocarbons. Preferably, the gel comprises the hydrocarbon in an amount that is at least 10 times the amount by weight of the crosslinked polyolefin in the gel, e.g., wherein the amount by weight of hydrocarbon in the gel is ten times or more, such as at least 20, 30 or 40 times the weight of the polyolefin in the gel.

The release of hydrocarbon and decomposition of the crosslinked polyolefin can advantageously be carried out in a typical commercial oil refining process such that the hydrocarbon-polyolefin composition can be treated in more or less the same manner as an oil feedstock in a refining process. For example, FIG. 2 (right) shows the composition of Example 1 can be thermally decomposed back to small hydrocarbon molecules without residue well below the typical crude oil refining temperature. Therefore, there would be little to no solid waste disposal.

Therefore, the crosslinked polyolefin-hydrocarbon compositions are suitable for regular oil refining processes. Thus saving a portion of the spilled oil (an economically valuable natural resource), currently treated as pollutants to the environments and have the added advantage of minimizing disposal of solid waste and due to the recyclability and degradability of the crosslinked polyolefins of the present disclosure.

Furthermore, polyolefin products are relatively inexpensive polymeric materials, with a large production capability around the world. It is estimated that the production cost of crosslinked polyolefins of the present disclosure can be below $2 per pound in large-scale industrial production. Thus, one pound of crosslinked polyolefin with 40 times absorption capacity can recover more than 5 gallons of the spilled oil (currently treated as a pollutant and waste) creating a product worth more than $12 (based on $80/barrel) and processable as regular crude oil.

The crosslinked polyolefins of the present disclosure can be prepared by any conventional means. In one aspect of the present disclosure, the polyolefin can be prepared by a conventional Ziegler-Natta catalyst followed by thermal crosslinking. Scheme 1 illustrates an example synthesis of a crosslinked polyolefin, 1-octene/styrene/divinylbenzene (OS-DVB) terpolymers (a).

Scheme 1: Synthesis of x-OS-DVB oil-SAP material.

In this scheme the crosslinked polyolefin is prepared using a heterogeneous Ziegler-Natta catalyst (i.e. $TiCl_3$ (AA)/$AlCl_2Et$; where AA represents an activated by aluminum metal). This traditional Ziegler-Natta catalyst shows effective incorporation of both 1-octene and styrene co-monomers and mono-enchainment of DVB at ambient temperature to form the OS-DVB terpolymer with high molecular weight ($M_w$>330,000 g/mol) and quite narrow molecular weight distribution ($M_w/M_n$~2). Basically, the styrene and DVB contents are directly proportional to the monomer feed ratios. As shown in Table 1, the high OS-DVB terpolymers, containing more than 20 mol % aromatic units (styrene and DVB), have been prepared without any detectable cross-linking reaction. All resulting OS-DVB terpolymers were processable (soluble) for forming various size and shape products (b). However, upon thermal heating (>220° C.) they become completely insoluble x-OS-DVB network structure (c) by engaging in a Diels-Alder [2+4] inter-chain cycloaddition reaction between two pendent styrene units in the adjacent polymer chains. This solid-state crosslinking reaction (effective and without by-product) can eliminate the need for expensive solution-removal of hydrocarbon-soluble fraction shown in many prior arts, in which the crosslinking reactions were usually carried out in dilute solutions with considerable amount of intra-chain coupling reaction.

After the solid-state thermal crosslinking reaction, the resulting x-OS-DVB terpolymers were divided into ¼" sized particles and subjected to a vigorous solvent extraction by refluxing in toluene for 36 hours. Any soluble fraction of the resulting x-OS-DVB that was not fully cross-linked into the network structure would have been extracted under these conditions. The gel % is determined by the weight ratio between the insoluble fraction over the starting x-OS-DVB terpolymer sample.

Figure 2:
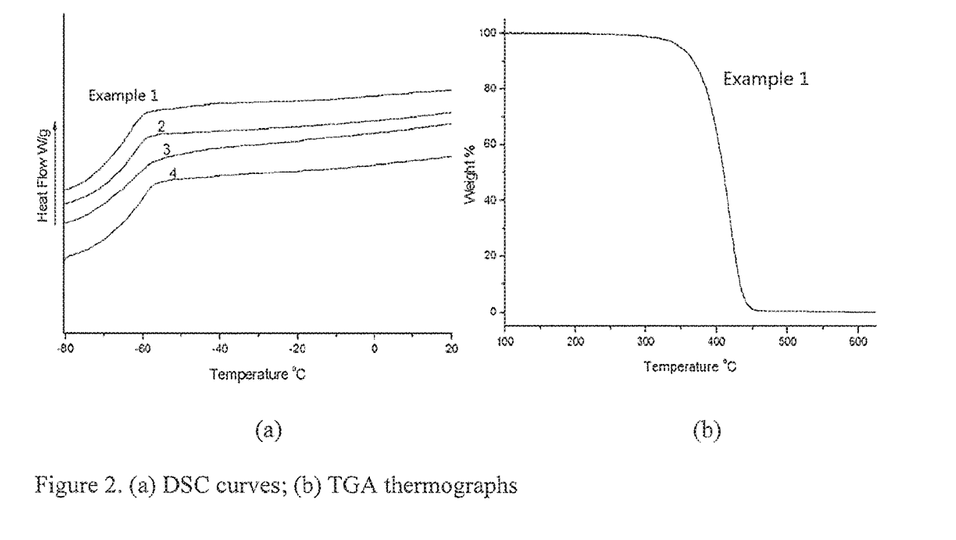
FIG. 2 shows data of thermal analyses of certain polyolefins according to the present disclosure.

FIG. 2 shows thermal properties of several x-OS-DVB terpolymer materials in Table 1, including differential scanning calorimetry (DSC) (FIG. 2a) and thermogravimetric analysis (TGA) measurements (FIG. 2b). FIG. 2(a) are DSC curves of four x-OS-DBV polyolefins (Examples 1, 2, 3 and 4 in Table 1). The DSC experiment was carried out on a Perkin-Elmer DSC-7 instrument controller with a heating and cooling rate of 20° C./min under nitrogen. All DSC curves exhibit only one sharp Tg transition in the flat baselines. There were no detectable melting points up to 200° C. Basically, the Tg (−80° C.) of poly(1-octene) linearly increases with its aromatic comonomer content. All x-OS-DVB terpolymers exhibit very low $T_g$'s (<−50° C.), even with 25 mol % of the aromatic (styrene and DVB) content. The combination is thus a homogeneous terpolymer microstructure with completely amorphous morphology with high free volume. FIG. 2(b) shows TGA curve of an x-OS-DVB sample (Example 1). The TGA experiment was carried out on a TA TGA Q500 instrument with a heating rate of 20° C./min under nitrogen. The x-OS-DVB terpolymer starts its thermal decomposition at 300° C., and rapidly decreasing its weight around 400° C. At 450° C., the x-OS-DVB terpolymer was completely decomposed without any residue, demonstrating the formation of volatile small molecules. The bulky side chains weaken the C—C bonds along the backbone and lower the ceiling temperature.

The resulting x-OS-DVB terpolymers (Examples 1-5 in Table 1) were contacted with various oils and pure hydrocarbons to show their oil absorption capability and kinetics. Since crude oil is predominantly a mixture of aliphatic and aromatic hydrocarbons with various molecular weights, and the exact molecular composition varies widely from formation to formation, we decided to examine a broad range of petroleum products, including some representative pure aliphatic and aromatic compounds. Table 1 summarizes the experimental results with several individual aliphatic and aromatic hydrocarbons (i.e. hexane, cyclohexane, benzene, and toluene) and some common petroleum products (i.e. gasoline, petroleum, and diesel).

The method for measurement of absorption capacity was carried out by following the standard method (ASTM F726-06) using various oils. Typically, a piece of polymer around 0.2 g was put into gasoline. After a certain time after reaching equilibrium, the sample was picked up with tweezers and weighed on a balance. Oil absorption capacity was calculated by the weight ratio between the absorbed oil to the original dried material. In order to study swelling kinetics, the above measurements were carried out from time to time. In addition, the absorption study was also extended to the individual crude oil components, including alkanes (such as heptane), cycloalkanes (such as cyclohexane), and aromatic hydrocarbons (toluene and xylene), respectively.

Figure 3:
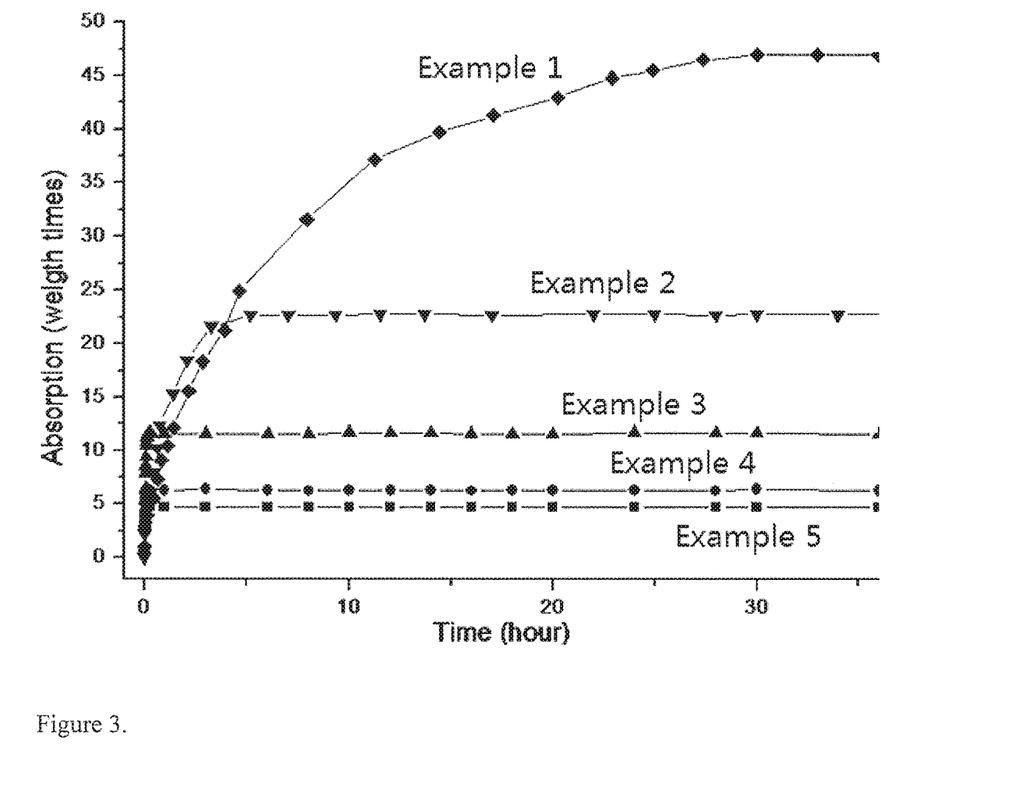
FIG. 3 is a chart showing oil uptake vs. time for certain polyolefins of the present disclosure.

FIG. 3 also compares the oil uptake vs. time for five x-OS-DVB samples (Examples 1-5 in Table 1) with a crude oil containing about 70% volatile light oils and 30% non-volatile heavy oils. The oil absorbency and swelling capacity in x-OS-DVB is largely controlled by cross-linking density. They are very minor dependence on the absorbates, either aliphatic or aromatic hydrocarbons, or even the mixed oil products. All x-OS-DVB contain both aliphatic and aromatic side chains with similar mole ratios, but different cross-linking densities. The lowest cross-linking density of x-OS-DVB (Example 1), with 82.3/17.4/0.3 1-octene/styrene/DVB mol %, exhibits a highest absorbent capacity and swell to a largest degree, which forms a softer and more cohesive gel formation. On the other hand, high cross-link density x-OS-DVB sample (Example 5) shows lower absorbent capacity and swell. The gel strength firmer and can maintain particle shape even under modest pressure.

Figure 4:
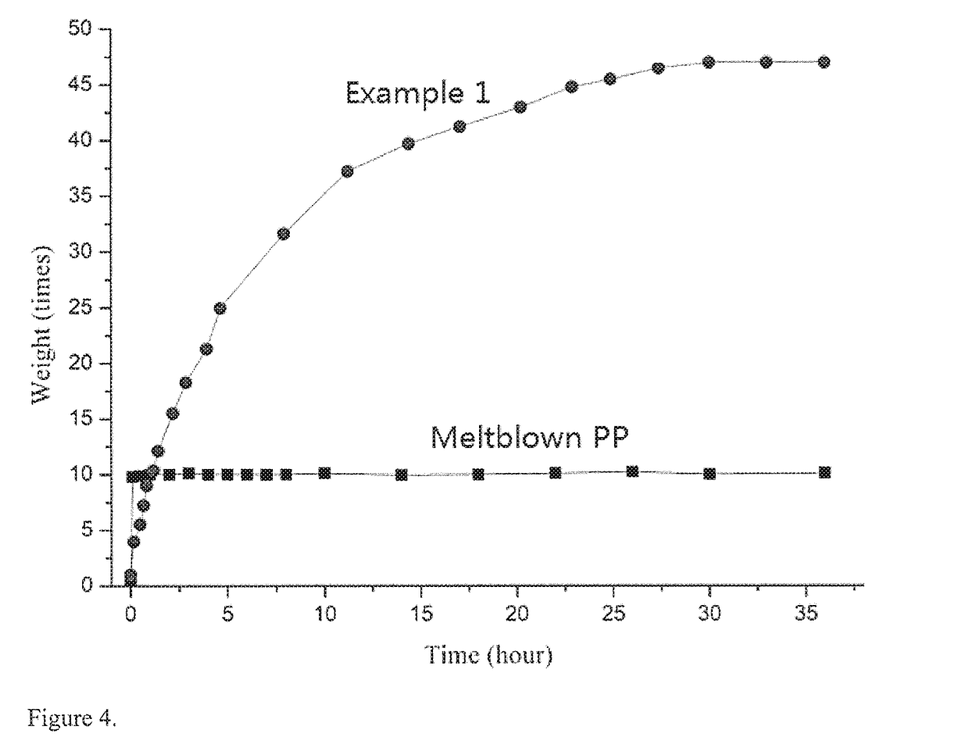
FIG. 4 is a chart showing oil uptake vs. time for a polyolefin of the present disclosure compared to a commercially available meltblown polypropylene pad.

FIG. 4 compares the oil absorption performance of x-OS-DVB sample (Example 1) with a state-of-the-art meltblown polypropylene (PP) pad that is fabricated from a nonwoven fibrous PP textile with highly crystalline polymer structure and porous morphology (high surface area). The PP pad was obtained from Newpig Corporation in Pennsylvania and indentified as PIG® White Oil-Only Mat Pads & Rolls. The samples were examined side-by-side for comparison. The meltblown PP pads (adsorption mechanism) show rapidly oil adsorption in their interstices by capillary action and saturated at the level about 10 times of weight uptake without any visible volume enlargement. The adsorption mechanism happened only on the PP fiber surfaces (not inside the matrix) is advantage with fast kinetics but limited capacity, and the weak oil-PP interaction results in some of the adsorbed oil re-bleeding under a slight external force. On the other hand, the lightly cross-linked crosslinked polyolefin sample (Example 1) with amorphous morphology gradually absorb oil in its matrix, increasing its weight by more than 10 times within 10 minutes, and reaching 40 times after 12 hours. Its overall oil sorption capacity is superior (>4 times) to that of state-of-the-art meltblown PP pad.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Example 1

Synthesis of 1-Octene/Styrene/Divinylbenzene (OS-DVB) Terpolymer

The polymerization reaction was conducted in a 300 ml stainless autoclave equipped with a mechanical stirring. The reactor was initially charged with 50 ml of toluene, 5 ml of 1-octene (31.9 mmol), 5 ml of styrene (43.3 mmol), and 0.2 ml of divinylbenzene (DVB) (1.4 mmol) in an argon filled dry-box. The reactor was then sealed and then moved from the dry box and purged with nitrogen gas at 30° C. About 0.101 g of $TiCl_3(AA)$ and 1 ml of $AlCl_2Et$ in 10 ml of toluene were stirred for about 20 minutes and then introduced under nitrogen pressure to the reactor to initiate the polymerization. After about 3 hours, the reaction was terminated by adding 100 ml of dilute HCl solution in methanol to the reactor. The polymer was isolated by filtration and was washed completely with methanol and dried under vacuum for about 8 hours. About 2.79 g of OS-DVB terpolymer was obtained.

The terpolymer was completely soluble in common organic solvents, including toluene and decalin. Its molecular structure was determined by a combination of $^1$H-NMR (Bruker AM-300 instrument in chloroform-d) and GPC measurements (Waters 1515 Isocratic HPLC pump with Waters 2414 refractive index detector). $^1$H-NMR spectrum shows the composition of 1-octene/styrene/divinylbenzene mole ratio=87.7/17.4/0.3, and the GPC curve indicates the terpolymer has a weight average molecular weight of about 330 Kg/mol and a polydispersity index ($M_w/M_n$) of about 2.1.

Before absorption measurement, the resulting polymer was divided into ½ inch size particles and was heated in an oven at about 220° C. for about 2 hours to obtain the cross-linked samples. The resulting cross-linked 1-Octene/Styrene/Divinylbenzene (x-OS-DVB) terpolymer was subjected to a vigorous solvent extraction by refluxing toluene for 36 hours to remove any soluble fraction that was not fully cross-linked into the network structure. After drying at 120° C. in vacuum for 8 hours, the insoluble x-OS-DVB fraction was weighed to determine the gel content. The gel content is a measure of the percent that the terpolymer is crosslinked and is determined by dividing the weight of the dried and extracted insoluble x-OS-DVB fraction over the weight of the dried OS-DVB sample prior to crosslinking. In this experiment, the dried and extracted insoluble x-OS-DVB fraction weighed 1.5688 g and the dried OS-DVB sample prior to crosslinking weighed 1.5679 g, resulting in a gel content of 99.94%. The results show that the x-OS-DVB terpolymer is fully crosslinked, i.e., has a gel content of almost 100%.

The resulting cross-linked x-OS-DVB terpolymer (identified as Example 1 in Table 1), was subjected to contact with various hydrocarbons by simple mixing at ambient temperature. A state-of-the-art meltblown PP pad (PIG® White Oil-Only Mat Pads & Rolls from Newpig Corporation in Pennsylvania) was also examined side-by-side for comparison. The absorption capacity was determined at ambient condition with various hydrocarbon components contained in crude oil, including hexane, hexane, cyclohexane, benzene, and toluene, respectively, as well as several oil products.

The absorption capacity was determined by measuring the weight ratio between the absorbed oil to the original dried x-OS-DVB as prepared in Example 1. As an example, a piece of dried x-OS-DVB sample initially weighing 0.201 g was dropped into 20 ml of gasoline in a glass bottle with a sealed cap. After 24 hours, the swelled gel was picked up by tweezers and had a weight of 8.502 g. The weight of this hydrocarbon-polyolefin composition was attributed to 8.301 g of absorbed gasoline and 0.201 g of polyolefin. The absorption capacity was calculated by dividing the weight of the absorbed hydrocarbon (8.301 g) over the weight of the dried starting material (0.201 g) to obtain an absorption capacity of 41.3. As shown in Table 1, the x-OS-DVB sample (Example 1) is an exceptional hydrocarbon and oil-absorbent. After 24 hours, this cross-linked OS-DVB material swelled and expanded its weight to more than 40 times its dry weight with all aliphatic (linear and cyclic) and aromatic hydrocarbons tested. On the other hand, the commercial meltblown PP pad showed a comparative adsorption capacity of about 10 times or less of its weight.

A sample of x-OS-DVB prepared as described in Example 1 was cut into a square piece of about a one quarter of an inch in size and then deposited into a beaker containing water and crude oil (North American Light & Sweet Crude). The starting ¼" sized sample effectively absorbed the crude oil from water surface. Upon absorption of the oil, the sample swelled to about greater than 40 times its initial volume and floated on the surface of the water as a gel like material. The gel was then collected by taking the sample off the water surface with a set of tweezers without leaking oil demonstrating a combination of good mechanical strength (due in part to the crosslinked structure) and strong affinity between oil and crosslinked polyolefin. It is expected that the sample would also be stable under ocean environments (waves, wind, sunlight, etc.) and easy to collect and remove from the water surface. Use of such material could be applied directly to the top of the leaking well head or oil slick or on an oil contaminated shoreline to form a gel that floats and can be readily collected and removed and thus mitigating pollution of water and air.

In addition to the effective oil recovery, the resulting gel can be treated as crude oil, suitable for regular refining processes (distillation and cracking). The oil loaded cross-linked polyolefin gel contains little to no water and has a composition similar to the original crude oil. During refining the gel, the minor component of the gel, which is the crosslinked polyolefin in about 2 wt % to about 5 wt % can be thermally decomposed back to small hydrocarbon molecules without residue. FIG. 2(b) shows the composition of Example 1 can be thermally decomposed back to small hydrocarbon molecules without residue well below the typical crude oil refining temperature (>600° C.). Therefore, there would be little to no solid waste disposal. Furthermore, polyolefin products are relatively inexpensive polymeric materials, with a large production capability around the world. It is estimated that the production cost of crosslinked polyolefins of the present disclosure can be below $2 per pound in large-scale industrial production. Thus, one pound of crosslinked polyolefin with 40 times absorption capacity can recover more than 5 gallons of the spilled oil (currently treated as a pollutant and waste) creating a product worth more than $12 (based on $80/barrel) and processable as regular crude oil.

Examples 2-5

Additional Synthesis of OS-DVB Terpolymers

A series of examples were prepared in essentially the same procedure as described in Example 1. Polymerization for Examples 2-5 were carried out in 300 ml stainless autoclave equipped with mechanical stirrer. The same qualities of toluene, catalyst, co-catalyst, 1-octene, and styrene were introduced into the reactor as described for Example 1, except a gradually increasing divinylbenzene content (0.5, 1, 2.5, and 5 ml) was used for Examples 2-5, respectively. The increasing amount of divinylbenzene used in Examples 2-5 increases the cross-linking density of the examples. After about 1 hour, the reactions were terminated by adding 100 ml of dilute HCl solution in methanol. The polymers were isolated by filtration and were washed completely with methanol and dried under vacuum for about 8 hours. The molecular structures (mole ratios and molecular weights) of the terpolymers were determined by a combination of $^1$H NMR and GPC measurements (Table 1). Samples of the resulting OS-DVB terpolymers were heated at about 220° C. in vacuum oven for about 2 hours to obtain cross-linked x-OS-DVB samples. The gel content was determined in the manner described in Example 1 and the results are provided in Table 1.

The absorption capacity data for the various crosslinked samples of Examples 2-5, respectively, in various hydrocarbons are summarized in Table 1. The absorption capacity was determined in the same manner as described in Example 1.

TABLE 1

Synthesis and hydrocarbon absorption for several x-OS-DVB terpolymers[1]

| | Polymerization Results | | | | |
|---|---|---|---|---|---|
| Example no. | Monomer A/B/C[2] (ml) | Terpolymer [A]/[B]/[C][3] (mole ratio) | Yield (g) | $M_w$[4] (Kg/mol) | Gel[5] (%) |
| 1 | 5/5/0.2 | 82.3/17.4/0.3 | 3.07 | 330 | 100 |
| 2 | 5/5/0.5 | 79.3/20.2/0.5 | 3.76 | 410 | 100 |
| 3 | 5/5/1 | 78.4/20.7/0.9 | 3.94 | 420 | 100 |

TABLE 1-continued

Synthesis and hydrocarbon absorption for several x-OS-DVB terpolymers[1]

| 4 | 5/5/2.5 | 76.3/22.3/1.4 | 4.02 | 460 | 100 |
| 5 | 5/5/5 | 74.1/24.0/1.9 | 4.56 | 520 | 100 |
| PP[7] | — | — | — | — | 100 |

| | Absorption capacity (weight ratio)[6] | | | | | |
|---|---|---|---|---|---|---|
| Example no. | Gasoline | Petroleum | Diesel | Toluene | Hexane | Benzene | Cyclohexane |
| 1 | 41.3 | 40.3 | 41.1 | 47.1 | 42.8 | 40.7 | 43.5 |
| 2 | 21.1 | 19.6 | 20.0 | 22.7 | 20.4 | 19.8 | 22.0 |
| 3 | 13.7 | 11.6 | 11.9 | 11.6 | 11.9 | 14.1 | 14.1 |
| 4 | 6.41 | 6.28 | 6.39 | 6.24 | 5.62 | 5.59 | 7.02 |
| 5 | 5.45 | 5.34 | 5.40 | 4.75 | 5.10 | 5.21 | 5.80 |
| PP[7] | 9.21 | 9.71 | 9.09 | 10.0 | 8.10 | 10.4 | 11.3 |

[1]Polymerization condition: TiCl$_3$(AA)/AlCl$_2$Et = 0.101 g/4 ml (25 wt % in toluene), 50 ml of toluene, 25° C. for 3 h; Cross-linking condition: 220° C. for 2 h.
[2]A: 1-octene, B: styrene, and C: divinylbenzene.
[3]Determined by $^1$H NMR spectra.
[4]Measured by GPC with a standard polystyrene calibration curve.
[5]After thermal cross-linking reaction, the gel content was determined from the toluene-insoluble part after Soxhlet extraction.
[6]Absorption time: 24 hours
[7]Commercial meltblown PP pad (obtained from Newpig Corporation) (recovering hydrocarbons via an adsorption mechanism).

FIG. 3 is a plot of crude oil uptake vs. time for the x-OS-DVB polyolefins of Table 1. The crude oil used in this experiment is known as North American Light & Sweet Crude. It contained about 70% volatile light oils and about 30% non-volatile heavy oils. The polyolefins (Examples 1 to 5) of Table 1 have similar 1-octene/styrene mole ratios, but differ in the amount of DVB content and consequently differ in cross-linking density. As shown by the data in FIG. 3, the oil absorbency and swelling capacity in x-OS-DVB polymers are controlled by cross-linking density, i.e., swell capacity is inversely proportional to crosslink density. That is, as the mole content of DVB in the polymer increases and consequently the crosslink density increases, the absorption capacity of the polymer decreases. The lowest density cross-linked OS-DVB (Example 1, having a mole ratio of 82.3/17.4/0.3 1-octene/styrene/DVB mol %), exhibits a highest absorbent capacity and swelling. On the other hand, high cross-link density x-OS-DVB terpolymer (Example 5) shows lower absorbent capacity and very little swelling. The gel strength is firmer and can maintain particle shape even under modest pressure. Example 1 polyolefin absorbed more than 10 times its weight within 10 minutes, and absorbed more than 40 times its weight after 12 hours. Examples 2 and 3 polyolefins absorbed more than 20 times and more than 10 times their respective weights in 2-3 hours. After oil uptake, the polyolefin advantageously form a relatively soft and cohesive gel. The oil absorption capacity of the polyolefins provided as Examples 1 to 3 are superior to that of commercially available meltblown PP pad in terms of overall absorption capacity.

Examples 6-10

Synthesis and Evaluation of 1-Octene/Styrene/1,7-Octadiene Terpolymers

The polymerization reaction was conducted in a 300 ml stainless autoclave equipped with a mechanical stirrer. The reactor was initially charged with 50 ml of toluene, 5 ml of 1-octene, 5 ml of styrene, and various quantities of 1,7-octadiene (1.6 ml, 0.8 ml, 0.4 ml, 0.2 ml and 0.1 ml) in an argon filled dry-box. The reactor was then sealed and then moved from the dry box and purged with nitrogen gas at 30° C. About 0.101 g of TiCl$_3$(AA) and 1 ml of AlCl$_2$Et in 10 ml of toluene after sufficiently stirring were introduced under nitrogen pressure to initiate the polymerization. After about 1 hour, the reaction was terminated by adding 100 ml of dilute HCl solution in methanol to the reactor. The polymers were isolated by filtration and washed completely with methanol and dried under vacuum for about 8 hours. The 1-octene/styrene/1,7-octadiene terpolymers were completely soluble in common organic solvents, including toluene and decalin.

Before absorption measurement, the resulting polymers were divided into ½ inch size particles and were heated in an oven at about 220° C. for 2 hours to carry out a cross-linking reaction. Table 2 provides the absorption capacity data in toluene after 5 hours and 16 hours. Examples 6 to 8 show absorption capacity which is inversely proportional to the cross-linking density. However, Examples 9 and 10, with further reduction of cross-linking density, result in some solubility in toluene.

TABLE 2

Summaries of 1-Octene/Styrene/1,7-Octadiene Terpolymers.

| Example No. | Monomer A/B/C[1] (ml) | Yield (g) | In toluene for 5 h (weight ratio) | Absorption capacity (weight ratio) In toluene for 16 h |
|---|---|---|---|---|
| 6 | 5/5/1.6 | 3.77 | 25.81 | 25.65 |
| 7 | 5/5/0.8 | 4.46 | 36.50 | 36.88 |
| 8 | 5/5/0.4 | 4.21 | 42.25 | 43.88 |
| 9 | 5/5/0.2 | 3.60 | Partially soluble | |
| 10 | 5/5/0.1 | 3.42 | Partially soluble | |

[1]A: 1-octene, B: styrene, and C: 1,7-Octadiene.

As shown in Table 2, sufficiently crosslinked 1-Octene/Styrene/1,7-Octadiene polyolefins (B-1 to B-3) can absorb more than 20 time, 30 time and even 40 times their weight in an aromatic hydrocarbon, i.e. toluene, within about 5 hours.

Examples 11-15

Synthesis and Evaluation of 1-Octene/t-Butylstyrene/Divinylbenzene Terpolymers

The polymerization reaction was conducted in a 300 ml stainless autoclave equipped with a mechanical stirrer. In an argon filled dry-box, the reactor was charged with 50 ml of toluene, 0.2 ml of DVB, and various volume ratios of 1-octene and tert-butylstyrene (Oct/BSt=7/3, 6/4, 5/5, 6/4, and 7/3 ml). The reactor was then sealed and then moved from the dry box and purged with nitrogen gas at 30° C. About 0.101 g of TiCl$_3$(AA) and 1 ml of AlCl$_2$Et in 10 ml of toluene, after mixing for 20 minutes by stirring, were introduced to the reactor under nitrogen pressure to initiate the polymerization. After about 1 hour, the reaction was terminated by adding 100 ml of dilute HCl solution in methanol to the reactor. The 1-octene/t-butylstyrene/divinylbenzene terpolymers were isolated by filtration and washed completely with methanol and dried under vacuum for about 8 hours. The resulting terpolymers were completely soluble in common organic solvents, including toluene and decalin. Before absorption measurement, the resulting terpolymers were divided into ½ inch sized particles and heated in an oven at about 220° C. for about 2 hours to obtain fully cross-linked samples. Table 3 provides absorption capacity data for the samples in toluene after 5 hours and 16 hours.

TABLE 3

Summaries of 1-Octene/t-Butylstyrene/Divinylbenzene Terpolymers

| Exam. No. | Monomer A/B/C[1] (ml) | Yield (g) | In toluene for 5 h (weight time) | Absorption capacity (weight ratio) In toluene for 16 h |
|---|---|---|---|---|
| 11 | 7/3/0.2 | 5.72 | 9.84 | 7.44 |
| 12 | 6/4/0.2 | 6.69 | 17.43 | 25.45 |
| 13 | 5/5/0.2 | 4.43 | 35.46 | 37.48 |
| 14 | 4/6/0.2 | 3.30 | 28.34 | 34.81 |
| 15 | 3/7/0.2 | 2.89 | 16.50 | 24.99 |

[1]A: 1-octene, B: t-butylstyrene, and C: divinylbenzene.

As shown in Table 3, the crosslinked 1-Octene/t-Butylstyrene/Divinylbenzene polyolefins can absorb more than about 10 times, more than 20 times and even more than 30 times their weight in an aromatic hydrocarbon, i.e. toluene, within about 5 hours.

Examples 16-19

Synthesis and Evaluation of 1-Octene/t-Butylstyrene/1,7-Octadiene Terpolymers The polymerization reaction was conducted in a 300 ml stainless autoclave equipped with a mechanical stirrer. In an argon filled dry-box, 50 ml of toluene and various ratios of 1-octene/ter-butylestyrene/1,7-octadiene were charged into the reactor. The reactor was then sealed and then moved out from the dry box and purged with nitrogen gas at 30° C. About 0.101 g of $TiCl_3(AA)$ and 1 ml of $AlCl_2Et$ in 10 ml of toluene after sufficiently stirring were introduced to the reactor under nitrogen pressure to initiate the polymerization. After about 1 hour, the reaction was terminated by adding 100 ml of dilute HCl solution in methanol. The polymers were isolated by filtration and washed completely with methanol and dried under vacuum for about 8 hours. The terpolymers were completely soluble in common organic solvents, including toluene and decalin. Before absorption measurement, the resulting 1-octene/t-butylstyrene/1,7-octadiene terpolymers were divided into ½ inch size particles and were heated in an oven at about 220° C. for about 2 hours to obtain fully cross-linked samples. Table 4 provides the absorption capacity data for the crosslinked samples in toluene after 16 hours.

TABLE 4

Summaries of 1-Octene/t-Butylstyrene/1,7-Octadiene Terpolymers

| Example No. | Monomer A/B/C[1] (ml) | Yield (g) | Absorption capacity (weight ratio) In toluene for 16 h |
|---|---|---|---|
| 16 | 5/5/0.8 | 4.08 | 28.18 |
| 17 | 4/6/0.8 | 3.53 | 28.22 |
| 18 | 3/7/0.8 | 2.35 | 29.12 |
| 19 | 3/7/1.6 | 3.77 | 19.71 |

[1]A: 1-octene, B: t-butylstyrene, and C: 1,7-octadiene

As shown in Table 4, the crosslinked 1-Octene/t-Butylstyrene/1,7-Octadiene polyolefins can absorb more than about 20 times their weight in an aromatic hydrocarbon, i.e. toluene, within about 16 hours.

Example 20

Synthesis and Evaluation of Ethylene/1-Octene/1,7-Octadiene Terpolymer

In a dry Parr 300 ml stainless autoclave equipped with mechanical stirrer, 75 ml of toluene, 11.8 ml of 1-octene, 0.2 ml of 1,7-octadiene and 5 ml MAO solution (methylaluminoxane, 10 wt % in toluene) were mixed at 60° C. After purging with ethylene gas, about 1 μmol of rac-$Me_2Si[2$-Me-4-Ph$(ind)_2ZrCl_2$] catalyst diluted in 3 ml toluene was then syringed into the rapidly stirring solution under ethylene pressure to initiate the polymerization. After 3 minutes of reaction at 60° C. and under 220 psi pressure of ethylene gas, the polymer solution was quenched with methanol. The resulting product was washed with HCl/methanol (0.5M) and methanol each for 3 times, then vacuum-dried at 60° C. About 3.06 g of ethylene/1-octene/1,7-octadiene terpolymer was obtained with a catalyst activity of 61.2 Kg(PE)/mmol Zr/h. Before absorption measurements, the resulting polymer was subjected to a vigorous solvent extraction by refluxing toluene for 36 hours to remove any soluble fraction that was not fully cross-linked into the network structure. The soluble fraction was weight to calculate the data of gel content (insoluble fraction). The resulting ethylene/1-octene/1,7-octadiene terpolymer polymer from this reaction was not completely cross-linked, with only 40% insoluble fraction, as shown in Table 5.

Examples 21-24

Synthesis and Evaluation of Ethylene/1-Octene/1,7-Octadiene Terpolymers

A series of Ethylene/1-Octene/1,7-Octadiene terpolymers were prepared in a manner similar to the procedure described in Example 20. The polymerization reaction was carried out in 300 ml stainless autoclave equipped with a mechanical stirrer. The same qualities of toluene, MAO, and catalyst were introduced into the reactor as described for Example 20 and various volumes of 1-octene and 1,7-octadiene (11.5 ml/0.5 ml, 11 ml/1 ml, 10 ml/2 ml, 8 ml/4 ml) were injected to form the sample series Example 21 to 24, respectively. The polymerization was quenched with methanol after 3 minutes of reaction at 60° C. under 220 psi pressure of ethylene gas. The gel content of each resulting terpolymer was determined as discussed in Example 20. Only the fully cross-linked polymers were subjected to oil absorption with a small piece of sample (about 0.5 g) at room temperature. In addition, the absorption study was also extended into the individual crude oil components, including alkanes (such as heptane), cycloalkanes (such as cyclohexane) and aromatic hydrocarbons (toluene and benzene). The absorption capacity data for the various crosslinked samples of Examples 21-24, respectively, in various hydrocarbons are summarized in Table 5.

Example 25

Synthesis and Evaluation of Ethylene/1-Octene/1,7-Octadiene Terpolymer

The procedure Example 20 was followed in a 500 ml stainless autoclave equipped with a mechanical stirrer. After adding 200 ml of toluene, 11 ml of 1-octene, 1 ml of 1,7-octadiene and 5 ml MAO solution under ethylene gas, the 1 μmol of rac-$Me_2Si[2$-Me-4-Ph$(ind)_2ZrCl_2$ catalyst diluted in 3 ml toluene was then syringed into the rapidly stirring solution under ethylene pressure to initiate the polymerization. After 3 minutes of reaction at 60° C. under 110 psi pressure of ethylene gas, the polymer solution was quenched with methanol. The resulting product was washed with HCl/methanol (0.5M) and methanol each for 3 times, then vacuum-dried at 60° C. About 7.94 g of ethylene/1-octene/1,7-octadiene terpolymer was obtained with catalystic activity of 95.2 Kg(PE)/mmol·h. The gel content and absorption data were determined as the Example 20 and are shown in Table 5.

TABLE 5

Synthesis and oil absorption evaluation of ethylene/
1-octene/1,7-octadiene terpolymers.

| | Polymerization condition | | | | |
|---|---|---|---|---|---|
| Example No. | 1-octene (ml) | 1,7-octadiene (ml) | Yield (g) | Cat Activity (Kg/mmol · h) | Gel % |
| 20 | 11.8 | 0.2 | 3.06 | 61.2 | 40 |
| 21 | 11.5 | 0.5 | 4.24 | 80.5 | 76 |
| 22 | 11 | 1 | 4.74 | 94.8 | 100 |
| 23 | 10 | 2 | 5.38 | 108 | 100 |
| 24 | 8 | 4 | 9.51 | 190 | 100 |
| 25 | 11 | 1 | 7.94 | 95.2 | 100 |

| | Absorption capacity (weight ratio) | | | | |
|---|---|---|---|---|---|
| Example No. | Toluene | Heptane | Benzene | Cyclo-hexane | Gasoline |
| 20 | — | — | — | — | — |
| 21 | — | — | — | — | — |
| 22 | 19.5 | 17.4 | 17.1 | 23.2 | 18.3 |
| 23 | 15.3 | 11.1 | 10.8 | 19.7 | 13.5 |
| 24 | 10.2 | 8.3 | 8.2 | 11.8 | 10.3 |
| 25 | 22.4 | 18.1 | 15.1 | 29.1 | 17.1 |

As shown in Table 5, the crosslinked ethylene/1-octene/1,7-octadiene polyolefins can absorb between about 8 to about 29 times their weight in aliphatic and aromatic hydrocarbons.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, while the preferred embodiment has been described as applicable to various surgical joint wounds, the invention would have use in other body wounds with minor modifications that would be within the skill of the practitioner.

The disclosure provides crosslinked polyolefins effective for absorbing hydrocarbons and examples for their preparation, which includes polymerization using conventional Ziegler-Natta catalyst followed by thermal cross-linking reactions. The combination of oleophilic and hydrophobic properties with amorphous morphology, high free volume, and cross-linked network provides the crosslinked polyolefins advantages for absorption of crude oil and petroleum products. The oil uptake is inversely proportional to the cross-linking density. Oil uptake with up to more than 40 times of polymer weight and fast kinetics was observed in a lightly cross-linked x-OS-DVB terpolymer. Overall, the crosslinked polyolefins of the present disclosure exhibits a combination of benefits in oil recovery and cleanup, including (i) high oil absorption capability, (ii) fast kinetics, (iii) easy recovery from water surface, (iv) little to no water absorption, (v) minimal waste in natural resources, and (vi) cost effective and economic feasibility. All of these advantages can dramatically reduce the environmental impacts from oil spills.

While the claimed invention has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An absorbent product for use in recovering or containing hydrocarbons, the product comprising a crosslinked polyolefin having the following formula (II):

(II)

wherein ($CH_2$—$CH(R)$) represents the same or different olefin repeating unit; R is independently a $C_2$-$C_{30}$ linear, branched, or cyclic alkyl moiety; n is an integer greater than 500; ($CH_2$—$CH(Ar)$) represents the same or different aromatic repeating unit; Ar is an aryl moiety that can be substituted with one or more $R_1$ groups; wherein $R_1$ is a $C_1$ to $C_{10}$ linear, branched, or cyclic alkyl moiety that can be substituted with one or more $C_1$ to $C_5$ alkyl groups; p is an integer from 50 to 20,000; $R_2$ is either present or absent and when $R_2$ is present, $R_2$ is a $C_1$ to $C_{10}$ linear, branched, or cyclic alkyl moiety that can be substituted with one or more $C_1$ to $C_5$ alkyl groups; X is a cross-linking moiety that is a residue formed by a thermal cycloaddition reaction between two pendant styrene units, or between two pendant olefin units or between a pendant styrene unit and a pendant olefin unit; and q is an integer greater than 5; r is an integer from 0 to 100; n' is an integer between 200 and 5,000; p' is an integer between 20 and 2,000; X' is a branching moiety that is the residue of pendent olefinic unit after a chain transfer reaction incorporating a side chain.

2. The product of claim 1, wherein X is a cross-linking moiety that is a residue formed by thermal cycloaddition reaction between two pendant styrene units.

3. The product of claim 1, wherein the crosslinked polyolefin is completely amorphous.

4. The product of claim 1, wherein the crosslinked polyolefin has a Tg of less than about 10° C.

5. The product of claim 1, wherein the crosslinked polyolefin has the following formula (I):

(I)

6. The product of claim 1, wherein ($CH_2$—$CH(R)$) represents a $C_6$-$C_{30}$ alpha olefin repeating unit alone or a $C_6$-$C_{30}$ alpha olefin repeating unit with other olefin repeating units.

7. The crosslinked polyolefin of claim 1, wherein X is a crosslinking moiety that is a residue formed by a thermal cycloaddition reaction between two pendant styrene units, or between two pendant olefin units or between a pendant styrene unit and a pendant olefin unit.

8. The product of claim 5, wherein ($CH_2$—$CH(R)$) represents a $C_6$-$C_{30}$ alpha olefin repeating unit alone or a $C_6$-$C_{30}$ alpha olefin repeating unit with other olefin repeating units.

9. The crosslinked polyolefin of claim 5, wherein X is a crosslinking moiety that is a residue formed by a thermal cycloaddition reaction between two pendant styrene units, or between two pendant olefin units or between a pendant styrene unit and a pendant olefin unit.

* * * * *